Oct. 10, 1961 S. B. COLEMAN ET AL 3,004,156
SQUELCH CIRCUIT
Filed June 29, 1960
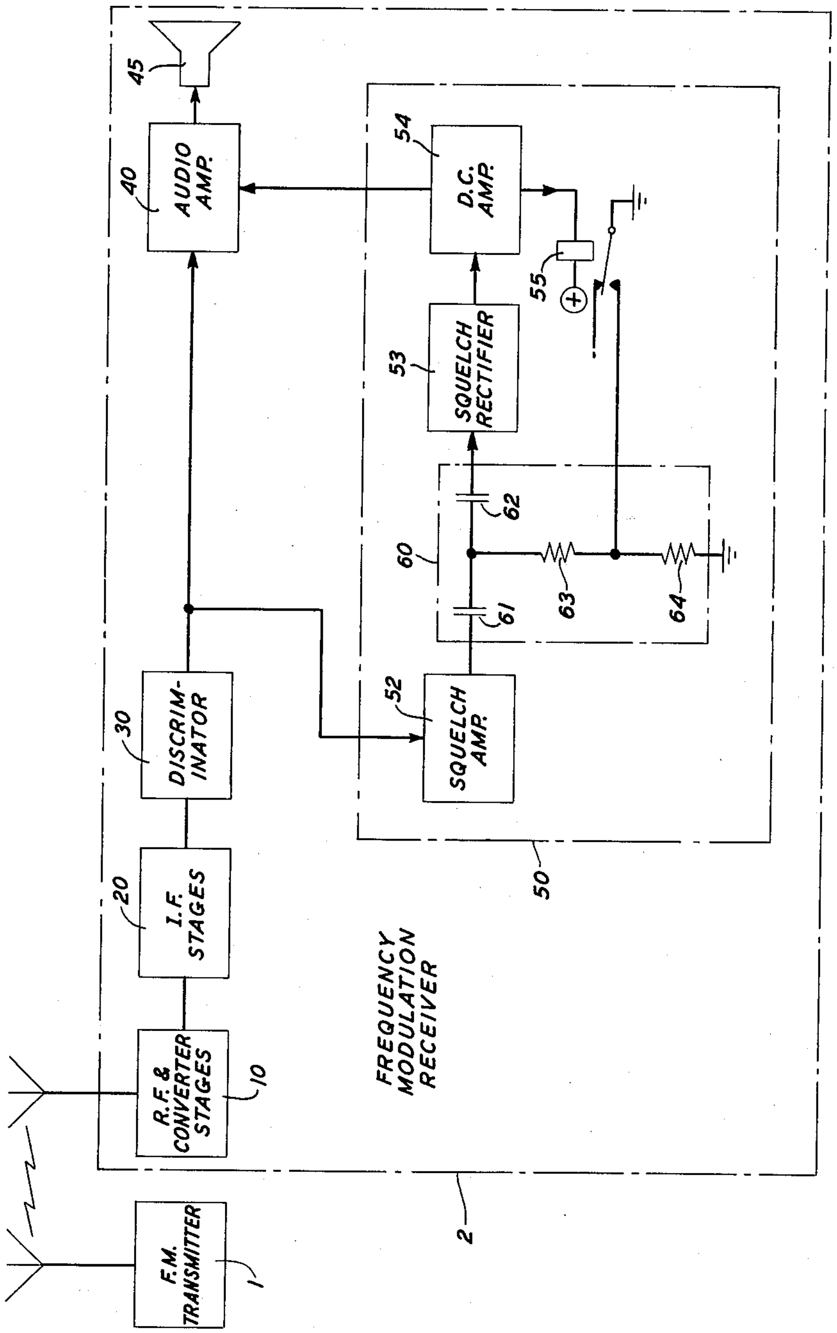
INVENTORS S. B. COLEMAN
D. S. WILLIAMS
BY [signature]
ATTORNEY United States Patent Office 3,004,156
Patented Oct. 10, 1961

3,004,156

SQUELCH CIRCUIT

Sidney B. Coleman, North Andover, and Don S. Williams, Andover, Mass., assignors to Bell Telephone Laboratories, Incorporated, New York, N.Y., a corporation of New York Filed June 29, 1960, Ser. No. 39,657
5 Claims. (Cl. 250—20)

This invention relates to frequency modulation receivers and more particularly to improvements in squelch circuits for such receivers.

It is well known that when no carrier signal or a severely attenuated carrier signal is being received by a frequency modulation receiver, atmospheric noise signals and the noise developed in the radio frequency section of the receiver are amplified and appear at the output of the receiver as a rushing or similar noise in the loud speaker or similar conversion means. This rushing noise is present until an adequate carrier signal is received and reduces the noise components to a negligible amount by the well-known "capture" effect observed in frequency modulation receivers. Such noise is extremely irritating to the operator of the receiver, especially in radio systems where the receiving equipment must be left on for long periods in readiness to receive and where the transmitting carrier must be turned on and off many times in rapid succession during the course of a two-way conversation. To prevent its occurrence squelch circuits are often used to control the audio amplifiers so that when no carrier or insufficient signal is being received the audio amplifiers are automatically blocked or turned off.

A squelch circuit is typically connected to the output of the discriminator in the frequency modulation receiver and accepts a selected portion of the discriminator output, which, in the absence of an adequate incoming carrier signal, is composed entirely of noise. The squelch circuit amplifies this selected portion, rectifies it, and applies the resultant direct current to the bias circuit of the audio amplifier to control transmission therethrough.

No practicably simple device exists which can distinguish energy in the discriminator output that is due to noise from that which is due to speech, except on the basis of its component frequencies. When the squelch circuit operates on a portion of the discriminator output which contains an appreciable proportion of frequency components arising from the presence of received speech, there is the possibility of the phenomenon called "talk-down" taking place. That is, when a received carrier signal has suppressed the noise and unmuted the receiver, the squelch circuit will mute the receiver again when it senses ensuing speech of sufficient strength. This may occur, for example, when a loud talker is causing the modulation of the carrier signal. It is to be noted that the frequency band adjacent to the speech band may contain considerable energy due to harmonic distortion products while speech is present in the discriminator output. Thus utilization of this portion of the noise spectrum involves essentially the same "talk-down" considerations even if the speech band itself is not admitted to the squelch circuit.

Although the noise energy from the discriminator is distributed over a frequency range extending throughout the speech range and upwards to frequencies much higher than those essential to satisfactory reception of speech, it is usually not uniformly distributed. Consequently, although the capture effect reduces the output of noise throughout the noise frequency range, noise remaining at any given level of received carrier signal is not necessarily distributed uniformly with respect to its component freqencies and a substantial amount of noise energy may remain in the speech band even though the higher frequency components may have been substantially suppressed by the received carrier signal. Such a condition is often encountered where radio frequency noise is generated by various electrical devices in the vicinity of a receiving station. It is to be noted that the intelligibility of the received speech under these conditions may be greatly impaired if the relative amount of noise energy simultaneously present in the speech frequency band is high.

To promote efficient use of the radio channel where such conditions are known to exist, it is accordingly desirable to adjust the squelch circuit operation so that the receiver will become operative, i.e., unmute, only when a carrier signal of sufficient strength to assure satisfactory communication is received. Precedence may thus be given to stations having adequately strong signals over those which temporarily, because of location, could communicate at best only with greatest difficulty, much repetition and little, if any, eventual satisfaction. If, to have such precedence, we elect to use the reduction of discriminator noise energy output in and adjacent to the speech frequency band, when applying this band to the squelch circuit, as the criterion of sufficiency of received carrier, we must take steps to prevent "talk-down."

The object of the present invention is accordingly to reconcile the conflicting requirements set forth above to improve the operating characteristics of squelch circuits.

In accordance with the invention, therefore, the squelch circuit is provided with means for varying the acceptance bandwidth so that when no carrier signal is present, energy in the noise frequencies, including that in the portion of the noise spectrum arising from the presence of noise sources which produce disturbances in the audible or speech frequency range, is applied to the squelch circuit and produces a large output to control the bias on the audio amplifiers. In this condition it requires a large carrier signal to overcome the noise to unmute the receiver.

When a sufficient carrier signal is received, the resulting squelch operation is arranged to be accompanied by a change in the acceptance band of the squelch circuit so that energy which might otherwise cause "talk-down" is excluded. After this condition has been established, only a relatively weak signal is required to prevent the muting of the audio output. Not only is "talk-down thus avoided, but unwanted interruption to reception, during brief periods when the initially strong carrier may fade or decrease momentarily in strength, is also prevented.

These and other features and advantages of the invention will appear more clearly and fully upon consideration of the following specification taken with the drawing, the single figure of which is a block diagram of a communication system including a frequency modulation transmitter and a frequency modulation receiver including a variable bandwidth squelch circuit in accordance with the invention.

In the drawing, there is shown a communication system including a frequency modulation transmitter 1 and a frequency modulation receiver 2. The frequency modulation receiver includes radio frequency and converter stages 10 which select the channel of reception and amplify the incoming signal at the frequency of the channel selected and convert this frequency to the intermediate frequency, of the receiver. The signal is thereafter amplified by the intermediate frequency stages 20, which may include the usual limiters employed in frequency modulation receivers. After amplification by the intermediate frequency stages, the signal is demodulated to the audio frequency by discriminator 30. The signal at the output of discriminator 30 is applied to both the squelch circuit 50 and the audio amplifier 40 wherein it is amplified and thereafter applied to a speaker or other output transducer 45.

The squelch circuit 50 can be thought of broadly as a filter including amplifying and rectifying means whereby the squelch circuit selectively amplifies and rectifies only energy in a certain frequency range as determined by the band limiting means within the squelch circuit. The squelch circuit 50 includes squelch amplifier 52, which amplifies the energy at the output of the discriminator, a squelch rectifier 53, which converts the amplified energy to a direct-current signal, the value of which depends upon the magnitude of the input signal, and a direct-current amplifier 54 which amplifies this direct-current signal and applies it to the bias circuit of the audio amplifier 40. The squelch circuit 50 further comprises the band limiting device which is shown as a variable high-pass filter 60 with means for changing the band-pass characteristics of the filter 60 which, by way of example, is shown as including relay 55 and its associated contacts. Flter 60 comprises coupling capacitors 61 and 62 in conjunction with resistors 63 and 64. It is to be understood that this filter 60 could be replaced by any equivalent filter having similar band-pass characteristics and could also be located anywhere in the squelch circuit prior to the squelch rectifier 53 and subsequent to the discriminator 30.

The means for changing the band-pass characteristics of the squelch circuit, the relay 55, is disclosed as being operative in response to the output of direct-current amplifier 54. When a sufficiently strong carrier signal is being received to remove the noise frequencies from the output of the discriminator by "capturing" the receiver, the output of the direct-current amplifier 54 is reduced and relay 55 is released, thereby initiating the change in filter characteristic and simultaneously unmuting the audio output. When the carrier signal is no longer present in adequate amount, the energy in the noise frequencies will again produce an output at the direct-current amplifier sufficient to energize relay 55, thereby restoring the initial filter characteristic and simultaneously muting the audio output. It is to be understood that this means for changing the filter characteristic could be located anywhere in the receiver where the presence or absence of a sufficient carrier signal can be detected.

When the movable arm of relay 55 is in the position shown, the total resistance of resistors 63 and 64 will be operative in the filter 60. Therefore, the filter 60 will have a relatively large time constant and a relatively low frequency cutoff, thereby passing the noise frequencies including those arising from the presence of noise sources which produce disturbances in the audible range. This is the condition that exists when no carrier signal is being received and the receiver is to be muted by the squelch circuit. Under some circumstances it may be desirable to have an additional positive muting action in the receiver and this can be provided by utilizing the upper contact of relay 55. This upper contact can be connected to the grid of one of the tubes in the audio amplifier 40. This will prevent any signal from passing through the audio amplifier stages since it places a ground upon the grid thereby removing the audio signal input to this audio amplifier.

When a strong carrier signal is received by the frequency modulation receiver 2 and is acted upon by the radio frequency and converter stages 10 and the intermediate frequency stages 20 and detected by discriminator 30, the energy in the noise frequencies that were present at the output of the discriminator 30 will be largely suppressed by the "capture" effect of the frequency modulation receiver. This suppression of the energy in the noise frequencies will cause the output of the squelch circuit to decrease so that relay 55 becomes de-energized and the bias on the audio amplifier 40 is changed so that there will be a signal output. The receiver now has an output and is unmuted.

The de-energization of relay 55 will allow the movable arm to make contact with the lower contact of the relay. This places a ground at the junction between resistors 63 and 64, thereby decreasing the resistance in filter 60. This decrease of resistance in filter 60 will decrease the time constant of this filter, thereby increasing the lower frequency cutoff of this filter. Thus, the lower frequency components will no longer be passed by the filter and the squelch circuit will require relatively less carrier signal input to the receiver to remain unmuted. The input signal strength may now decrease, due to some cause such as a fade, to a level below that required to unmute the receiver without causing the receiver to mute.

Although a specific embodiment of the invention has been shown and described, it will be understood that it is but illustrative and that various modifications may be made therein without departing from the scope and spirit of the invention.

What is claimed is:

1. In a radio frequency receiver, the combination comprising means for detecting primarily the audio modulation frequency component of a received signal; a first channel responsive to the audio modulation frequency component at the output of said detecting means; a second channel selectively responsive to frequency components at the output of said detecting means for controlling the output of said first channel, said second channel including a variable pass-band filter, first means for amplifying all frequency components present in said second channel, means for changing the output of said first amplifying means to direct current, means for applying said direct current to said first channel to control the output of said receiver; and means responsive to the reception of a carrier signal for changing the pass-band of said filter.

2. In a frequency modulation receiver, the combination comprising means for detecting frequency modulation, means for amplifying and rectifying a portion of the signal appearing at the output of said detecting means, means for selecting only a desired portion of the output of said detecting means for application to said amplifying and rectifying means, said selecting means applying only noise frequencies above the audible range when a carrier signal is being received by said receiver and applying in addition noise frequencies in the audible range when no carrier signal is being received, and means for applying the output of said rectifying means to control the audio amplifiers in said receiver.

3. In a frequency modulation receiver having a discriminator and an audio amplifier normally transmitting the output of said discriminator, a squelch circuit including a variable pass-band filter for selectively applying a portion of the output of said discriminator to said squelch circuit, a squelch amplifier, a squelch rectifier, and means for applying the output of said squelch circuit to said audio amplifier to control the output of said audio amplifier, and means responsive to the presence of a carrier signal in said receiver for varying the pass-band of said filter.

4. In a squelch circuit for a frequency modulation receiver having a discriminator and an audio amplifier, the combination comprising a noise amplifier for amplifying a portion of the output of said discriminator, a noise rectifier, a variable pass-band filter connecting the output of said noise amplifier to the input of said noise rectifier, means for applying the output of said noise rectifier to control said audio amplifier, and means for varying the pass-band of said filter to modify the sensitivity of the squelch circuit in response to the reception of a carrier signal of sufficient strength by said receiver.

5. In a frequency modulation receiver having a discriminator and an output audio amplifier, filter means for selecting predetermined frequency components at the output of said discriminator for control of squelch operation, a noise amplifier for amplifying said frequency components, a noise rectifier for rectifying the amplified output of said noise amplifier, means for applying the output of said noise rectifier to control said audio amplifier, means for varying the pass-band of said filter means in accordance with the presence of a carrier signal of sufficient strength in said receiver, and means for coupling the input of said audio amplifier to ground when no carrier signal is present in said receiver.

References Cited in the file of this patent

UNITED STATES PATENTS 2,831,106 Clark ------------------ Apr. 15, 1958